O. P. NYSTROM.
MOLDING MACHINE.
APPLICATION FILED OCT. 30, 1915.
1,211,618.
Patented Jan. 9, 1917.
8 SHEETS—SHEET 1.
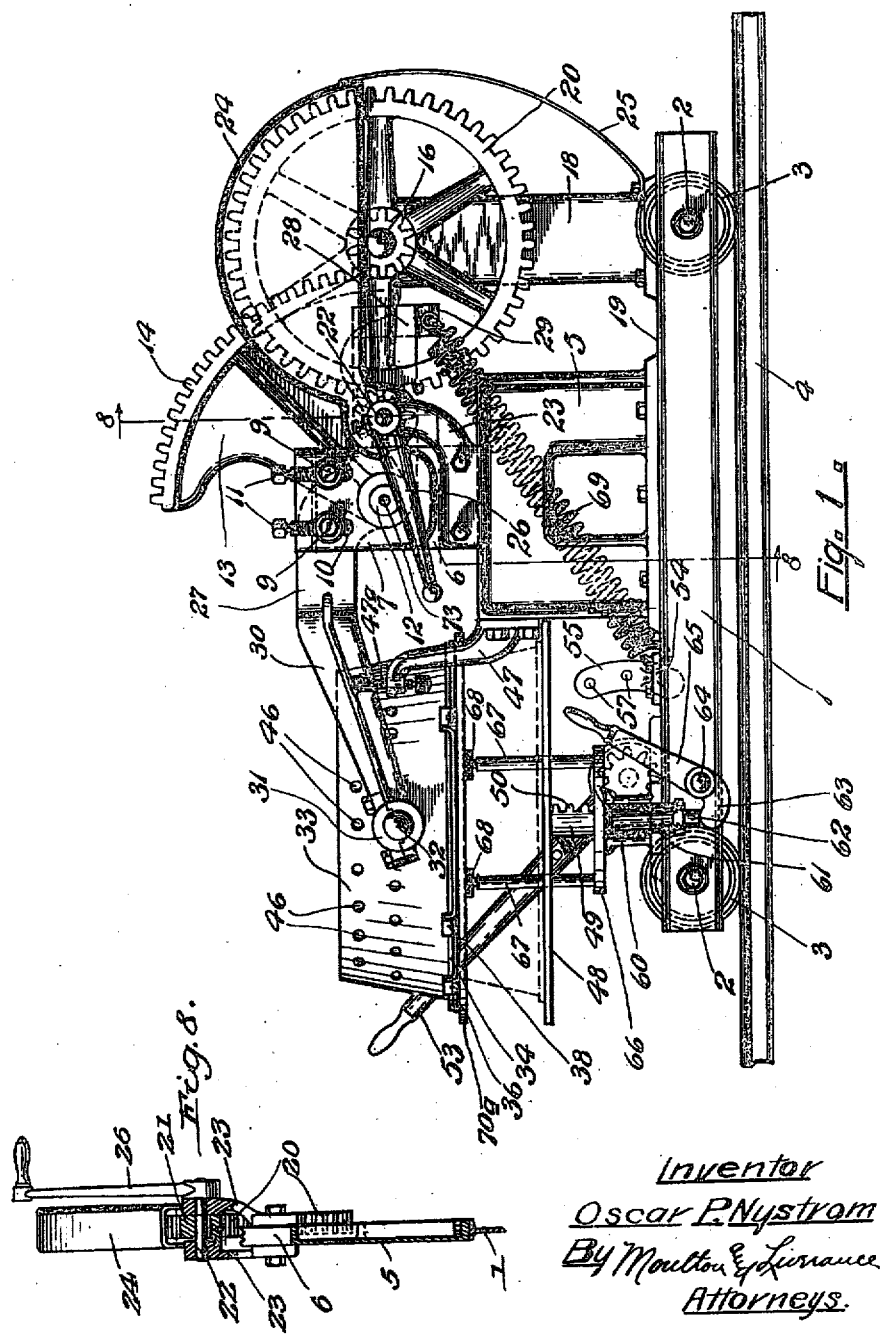
Inventor
Oscar P. Nystrom
By Moulton & Lurrance
Attorneys.

O. P. NYSTROM.
MOLDING MACHINE.
APPLICATION FILED OCT. 30, 1915.
1,211,618.
Patented Jan. 9, 1917.
5 SHEETS—SHEET 2.
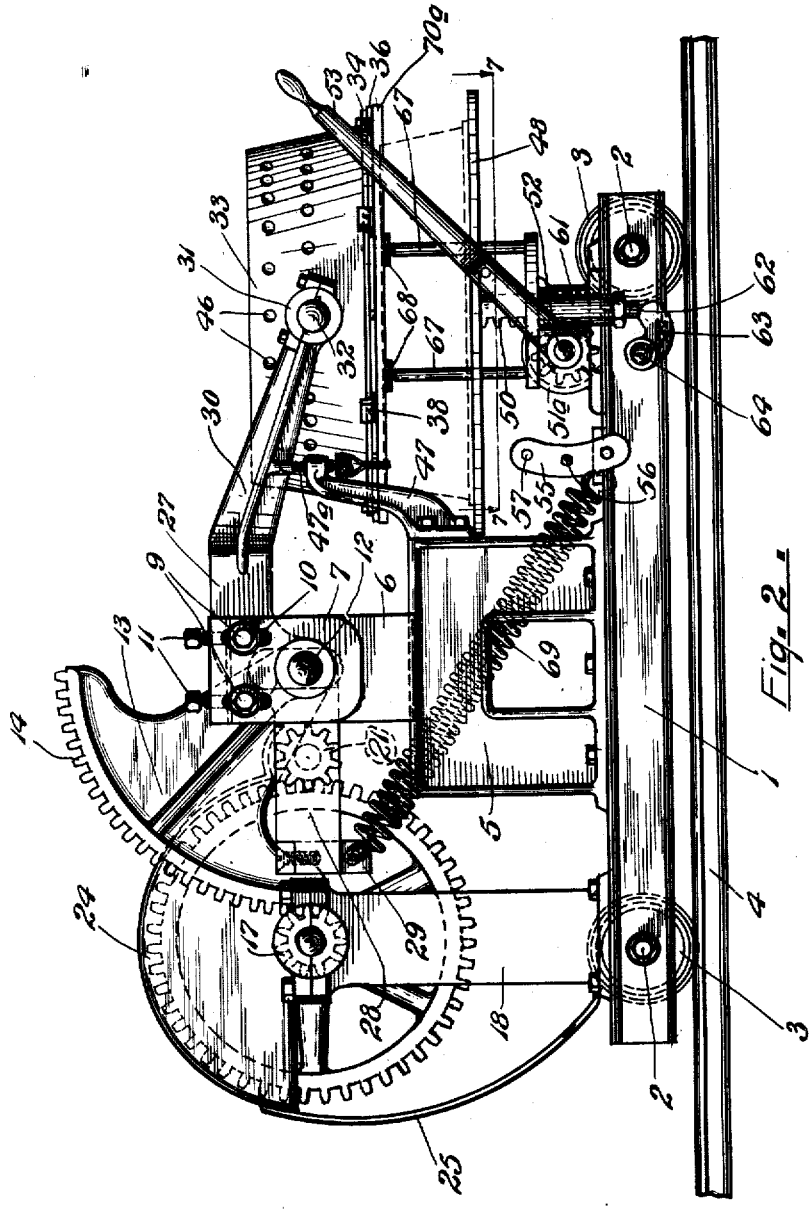
Inventor
Oscar P. Nystrom
By Moulton & Lumance
Attorneys.

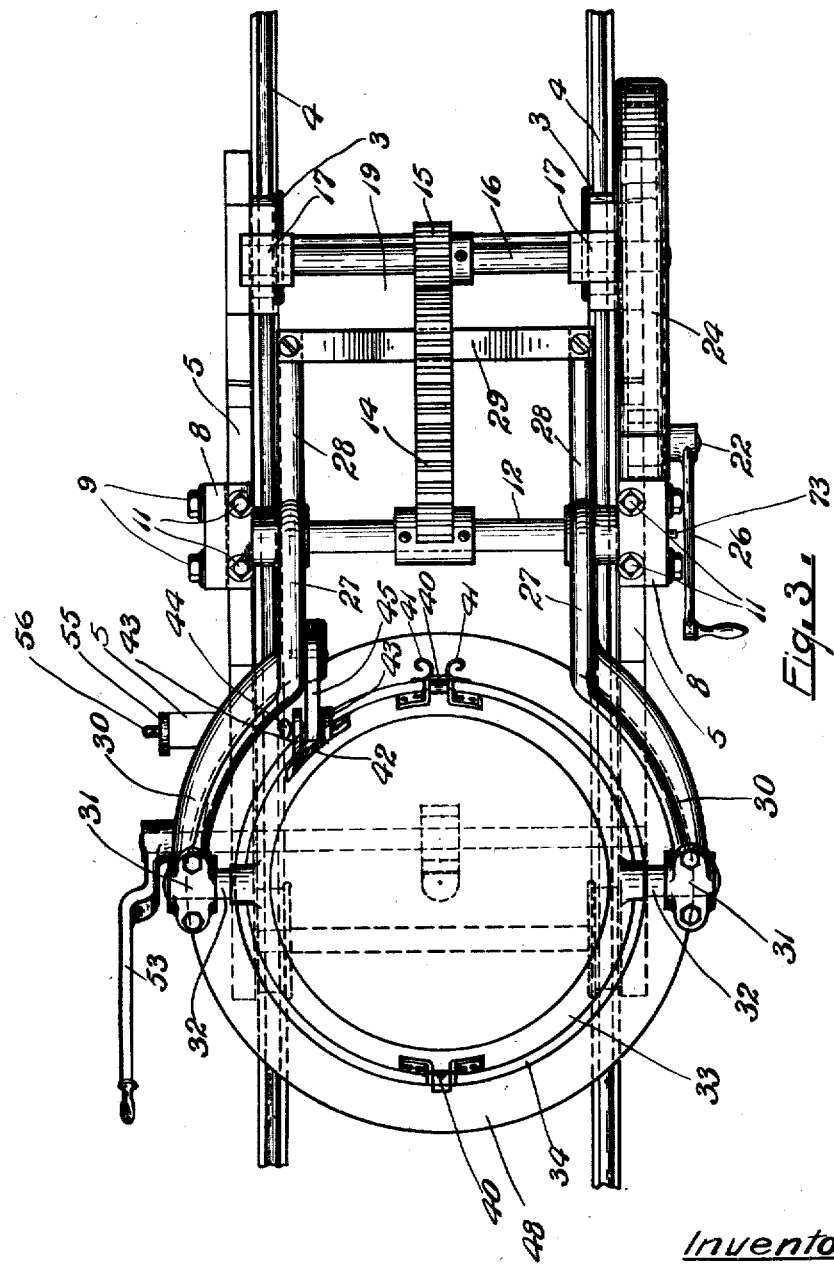

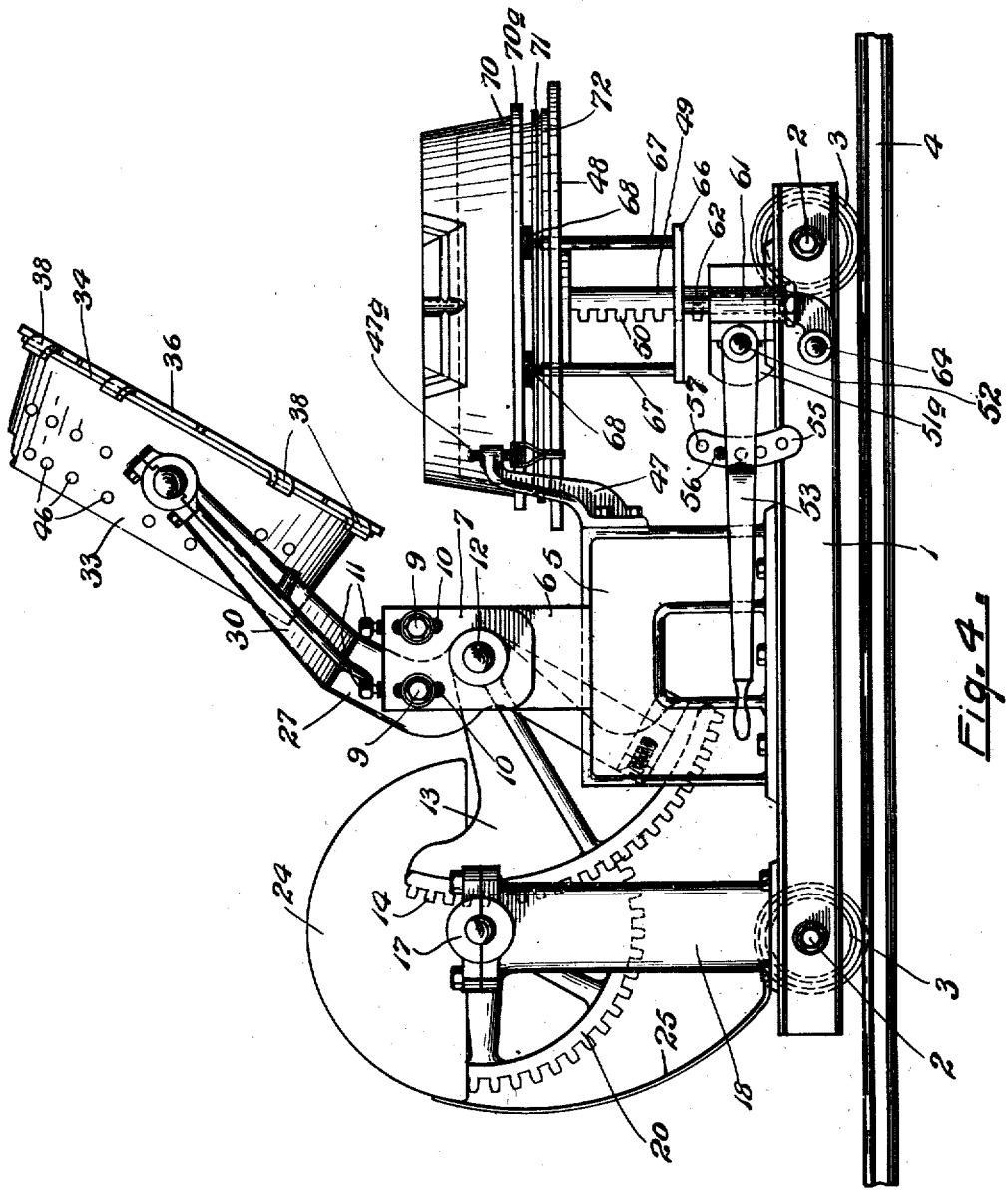

O. P. NYSTROM.
MOLDING MACHINE.
APPLICATION FILED OCT. 30, 1915.
1,211,618.
Patented Jan. 9, 1917.
5 SHEETS—SHEET 5.
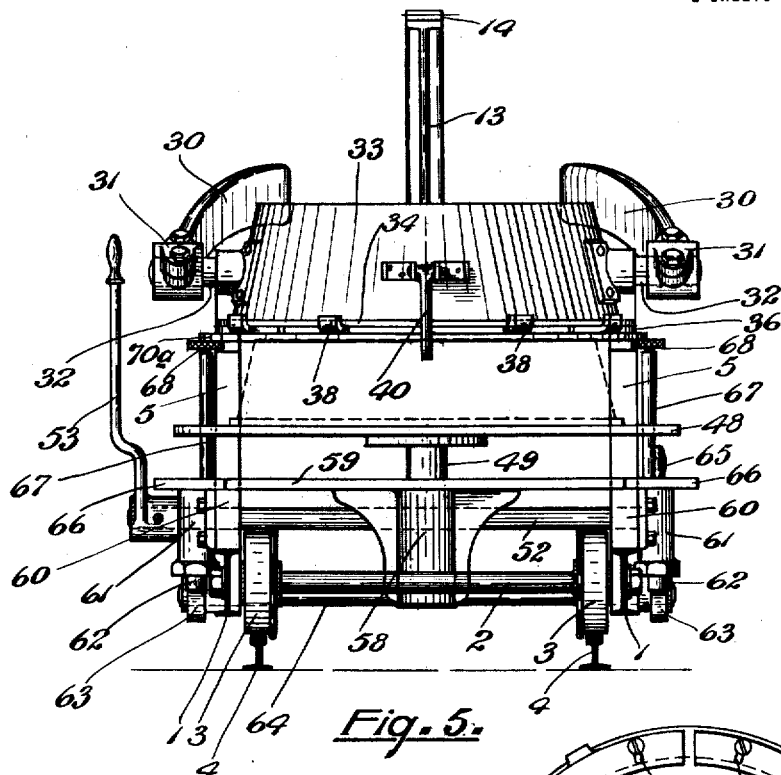
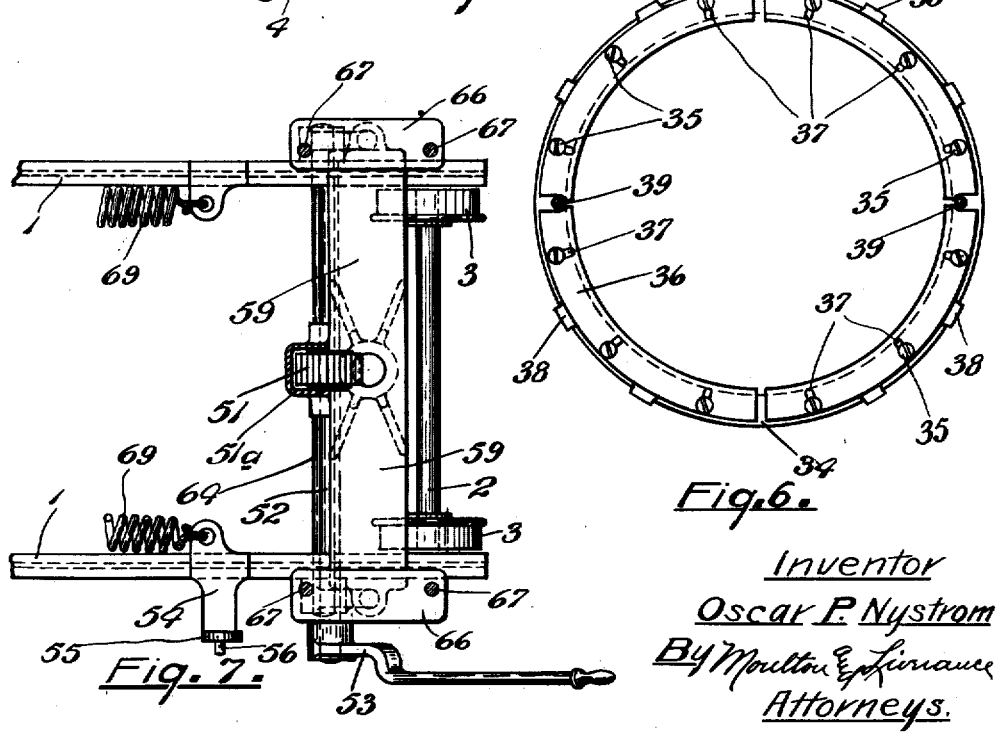
Inventor
Oscar P. Nystrom
By Moulton & Linnane
Attorneys.

UNITED STATES PATENT OFFICE.

OSCAR P. NYSTROM, OF HOLLAND, MICHIGAN.

MOLDING-MACHINE.

1,211,618.  Specification of Letters Patent.  Patented Jan. 9, 1917.

Application filed October 30, 1915. Serial No. 58,831.

*To all whom it may concern:*

Be it known that I, OSCAR P. NYSTROM, a citizen of the United States of America, residing at Holland, in the county of Ottawa and State of Michigan, have invented certain new and useful Improvements in Molding-Machines; and I do hereby declare the following to be a full, clear, and exact description of the invention, such as will enable others skilled in the art to which it appertains to make and use the same.

This invention relates to molding machines for use in foundries.

The object and purpose of the invention is the production of a machine which may be used to make molds, using green sand as is usual, by means of which molds for the production of any casting may be made much more rapidly than heretofore at a great reduction in the cost of labor, and also by means of which the usual flasks are eliminated so that the completed molds are of smaller size thereby effecting a great saving in floor space in a foundry.

The invention also has for an object the provision of a machine which will occupy but little space and by means of which molds for castings of large size may be produced.

To these ends together with many others not specifically enumerated, I have made the invention and embodied it in a construction which is shown in the accompanying drawings, in which;

Figure 1 is a side elevation of the machine. Fig. 2 is a smaller elevation taken from the opposite side of the machine. Fig. 3 is a plan view thereof. Fig. 4 is a side elevation taken from the same side of the machine as shown in Fig. 2 but with the parts in different positions. Fig. 5 is an end elevation taken from the right of Fig. 2. Fig. 6 is a plan view of the flash forming one element of the machine; and Fig. 7 is a sectional view taken on the line 7—7 of Fig. 2 looking in the direction indicated by the arrows. Fig. 8 is a section on the line 8—8 of Fig. 1.

Like reference characters refer to like parts throughout the several views of the drawings.

In the construction of the machine a carriage is provided including spaced apart I-beams 1 between which are located shafts 2 which carry rollers 3 running on the rails or tracks 4 so that the carriage and all parts secured thereto may be moved to any desired position along the length of the rails. At a point between the end of each I-beam 1 an upright casting 5 is secured on the upper side thereof terminating in a narrower supporting portion 6 on which is adjustably mounted a casting 7, the major portion of which lies on the outside of the extension 6 and which has an upwardly extending section 8 passing over the top of the support 6. Bolts 9 extend through the supports 6 and through slots 10 in the casting 7 whereby this casting may be adjusted vertically with respect to its support and may be held in adjusted position by tightening nuts on the bolts 9 and by operating the set screws 11 which extend through the horizontal section 8 and bear against the upper end of support 6. A shaft 12 is supported by and between the castings 7, and is adjusted vertically with the movement of said castings as will be readily apparent, it being understood that the extensions 6 to the supports 5 are slotted to permit the insertion of the shaft 12 therethrough as indicated in dotted outline in Fig. 2.

Shaft 12 has an arm 13 rigidly secured thereto which is flared outwardly and formed into substantially an arc of a circle being provided at its outer extremity with a gear segment 14 which meshes with a pinion 15 secured to a shaft 16 at its ends mounted in suitable bearings 17 located at the upper ends of upright supports 18, one being attached at one end of each of the I-beams 1. A platform 19 is provided lying above and connecting the I-beams to give greater rigidity to the mechanism and serving to catch any sand that may drop upon it. A large gear 20 is fixed at one end of the shaft 16 meshing with a pinion 21 fixed on a short shaft 22 which is mounted between brackets 23, one at either side of one of the extensions 6 to the supports 5 heretofore described. Gear 20 and pinion 21 are covered and guarded from the entrance of sand between the teeth thereof by an inclosing guard 24 which at one end is supported by the brackets 23 and at the opposite end by a strap 25. A crank 26 fastened to the end of shaft 22 may be used to manually operate the gearing thus described and it will be evident that on turning the crank the shaft 12 is rotated, the design of the gearing being such that to accomplish a partial revolution of shaft 12 the crank must be turned through many revolutions.

A pair of spaced apart members are secured to the shaft 12 and rotate therewith, each consisting of a forwardly extending arm 27 and a rearwardly extending arm 28, these latter arms being connected by a cross bar 29. Each of the arms 27 is curved outwardly and extends forwardly in substantially the arc of a circle as shown at 30, the ends of the extensions 30 carrying bearings 31 in which are mounted stud shafts or trunnions 32 projecting from diametrically opposed points from the sides of the flask 33. The flask in shape is substantially a truncated cone though it is to be understood that the particular shape of the flask is not an essential characteristic or feature of the invention. At one edge the flask is formed with an outwardly turned flange 34 in which are placed a number of screws 35 passing through curved sand retainers 36, which retainers are formed with slots 37 as shown to permit inward and outward movement thereof, whereby in inner position the inner edges of the retainers extend a short distance inside of the inner edges of the flask but in outer position lie in substantial alinement with said inner edges of the flask, the screws passing through the slots. The retainers have integral projecting finger holds 38 by means of which they may be manually operated. At diametrically opposed points pins 39 extend from the flange 34 of the flask. A pair of hooks 40 are pivotally attached to the outside of the flask at diametrically opposed points and at points 90 degrees removed from the trunnions 32. One of these hooks as shown in Fig. 3 may be held in upright position between spring clips 41. The object of these clips for this one hook will later appear. The flask 33 also has a casting 42 fixed thereto adjacent one of the extensions 30 to an arm 27 being formed with spaced apart projections 43 through one of which a set screw 44 extends. An arm 45 is pivotally attached to one of the arms 27, its end being adapted to locate between the projections 43 in such manner that by tightening the set screw 44 the flask may be held rigid with respect to the arms 27. It is understood that, normally, the flask is adapted to be turned about the axis of trunnions 32. The flask is also provided with a plurality of openings 46 through which rods may be passed to retain one part of the mold within the flask as will later appear. Brackets 47 are secured one to each of the supporting castings 5 at their ends carrying adjusting screws 47ª against which the extensions 30 rest when the flask is in position to receive the sand. These screws may be adjusted to any desired position to properly locate the flask.

A table 48 having a diameter greater than the diameter of the flask is supported at the upper end of a post 49, one side of which is formed as a rack 50 which meshes with a pinion 51 secured on a shaft 52, the shaft extending transversely of the I-beams 1 and supported at its ends in suitable bearings fastened to said I-beams. The pinion 51 is housed in a casing 51ª to prevent sand from coming in contact therewith. At one end of shaft 52 and at the side of the machine opposite where crank 26 is located a lever 53 is secured by means of which the table may be raised and lowered. A bracket 54 secured to one of the members 1 extends outwardly and terminates in a curved section 55 which is adapted to receive a pin 56, this pin being removably seated in any one of the openings 57 formed therein. When the lever 53 is in the position shown in Fig. 4 and below the pin 56 the table 48 is elevated to one of its uppermost positions. Post 49 is slidably supported in a sleeve 58 cast integral with and on the underside of a bar 59 which is interposed between and at its ends supported by short supports 60 which are bolted on the upper sides of the I-beams 1.

Each of the supports 60 on its outer side has a sleeve 61 connected thereto through which loosely passes a rod 62, its lower end resting on a cam 63, one of these cams being secured at each end of a shaft 64 which extends through and is supported by the I-beams 1. One of the cams 63, as shown in Fig. 1, may be provided with a handle extension 65 by means of which shaft 64 may be manually operated to elevate the rods 62. Each rod 62 at its upper end has a bar 66 secured thereto from which projects two spaced apart upright rods 67 in the upper ends of which set screws 68 are adjustably mounted. Rods 67 pass through the table 48.

In the operation of making a mold in this molding machine the table 48 is elevated to an upper position as shown in Fig. 4 and the flask 33 is lowered thereon with the larger end of the flask opening upwardly or opposite to that shown in Figs. 1 and 2. As the flask is lowered on to the table its downward movement is checked and cushioned by strong coil springs 69 interposed between the end of each arm 28 and the frame work of the mechanism as shown in Figs. 1 and 2. The pattern 70 which has an outwardly extending flange 70ª is then placed in the flask, entering the open upper and larger end, it being evident that openings must be formed in the flange to receive pins 39 and properly position the pattern with respect to the flask. The sand retainers 36 which, in this position of the flask, lie directly under the flange 70ᵃ of the pattern are pushed inwardly before the pattern is put in the flask and above the pattern is placed a spacing ring 71, it also necessarily having openings to receive the pins 39. One side of the mold is then made by placing and ramming green sand against the pattern, it being properly rammed and vented, after which the sand is struck level in a plane with the upper surface of the ring 71, a plate 72 being then laid on the mold and clamped in position by hooks 40. The handle 26 is then operated to elevate the flask into substantially the position shown in Fig. 4, the flask being turned over and again lowered on to the table. The opposite side of the mold is then filled and tamped, it being evident that that part of the mold first formed is in the meantime held between the pattern and the plate 72, bars being passed through the flask through the openings 46. When this side of the mold is completed the handle 26 is again operated to elevate the flask, the part 45 previously having been secured between the projections 43 so that as the flask is elevated it is held rigid against rotation with respect to the extensions 30. When the flask has been elevated sufficiently a pin 73 slidably mounted in the end of shaft 12 is drawn outwardly serving as a stop to prevent the backward turning movement of the handle 26 and holding the flask with the upper part of the mold in the position shown in Fig. 4. Before this raising of the flask hooks 40 have been disengaged from the plate 72 and the rearmost hook placed between the springs 41, it being evident that without these springs the rear hook would drop into lower position when it was elevated as shown in Fig. 4. Simultaneously with the raising of the flask the pin 56 is withdrawn and the handle 53 permitted to move to the position shown in Figs. 1 and 2 lowering the table 48 with the plate 72 spacing ring 71 and the lower portion of the mold thereon. The pattern 70, however, has its flange 70ᵃ extended far enough out that it rests upon the heads of screws 68 which may be adjusted to bear against the flange of the pattern and with the lowering of the table the pattern remains in position resting on the screws, the lower part of the mold being withdrawn therefrom. The operators of the machine may now remove the pattern and the ring 71 with especially large patterns and flasks, the handle 65 is operated to thereby elevate parts 66, rods 67 and screws 68 in this manner bringing the pattern above the lower part of the mold so that it may be easily removed without danger of injury to the mold. The table is then elevated by operating the handle 53 substantially into the position shown in Fig. 4, it being understood that at this time the pin 56 is moved into a lower opening 57 to thereby elevate the table slightly above the position that it originally occupied, the increase in elevation of the table being made to take care of the space formerly occupied by the flange 70ᵃ of the pattern which has been withdrawn. The flask is then lowered to its original position, the bars through openings 46 are withdrawn, the sand retainers are pulled outwardly and the flask is again elevated leaving the upper part of the mold seated upon the lower part thereof, the whole resting on the plate 72 which may now be slid outwardly over the table 48 and carried to any suitable position for pouring. The set screw 44 is then loosened, the flask turned to original position. The operation may be repeated indefinitely for other molds.

It is apparent that a mold thus made is much smaller than if a large and cumbersome flask was around it. In pouring, a thin metal jacket is placed around the mold, to cover the parting between the two parts of the mold and a plate is placed above the mold which has rods attached thereto having hooked ends to engage underneath the plate 72. When a mold has been poured it needs to set but a short time and then the jacket may be removed and placed on another mold. In practice a large number of molds are put up usually between forty and fifty a day and I have found that but six or seven jackets at the most are required in the pouring of this large number of molds. The molding process may be repeated indefinitely and all that is required is a plate 72 for each mold formed. No parts of the mechanism are exposed for the entrance of sand and there are no parts of the machine that are at all liable to get out of order.

It is of course understood that the plate 72 may be perforated for the required ventilation of the mold and that the passage of rods through the openings 46 and removal thereof from the mold are a great aid in venting it.

Changes in minor detail may be resorted to without departing from the invention defined in the appended claims. Accordingly I consider myself entitled to all modifications of structure falling within their scope.

I claim:—

1. In a molding machine, spaced apart supports, a shaft extending between the supports, spaced apart members connected to the shaft and extending therefrom, a flask pivotally mounted to turn about a horizontal axis between the ends of said members, a table located below the flask and to one side of the supports and means for rotating the shaft and attached members through an arc of a circle to elevate the flask above the table to permit its rotation, substantially as described.

2. In a molding machine, a table, a flask located above the table, supporting arms for the flask, said flask being rotatably mounted between the arms, means to operate the arms to raise and lower the flask with respect to the table, said means comprising a shaft to which the arms are secured, gearing associated with the shaft, and means to operate the gearing.

3. In a molding machine, spaced apart supports, a shaft rotatably mounted therein, arms connected to the shaft, a flask rotatably mounted between the free ends of the arms, a table on which the flask may rest, means to rotate the shaft to raise and lower the flask with respect to the table, means for raising and lowering the table, and means secured to the supports to hold the arms from downward movement beyond a predetermined point.

4. In a molding machine, a shaft, supports therefor, arms secured to and projecting from the shaft, a flask rotatably mounted between the arms, a bar pivotally mounted to one of the arms, means for detachably connecting the bar to the flask to hold it in rigid relation with respect to the arms, and means for rotating the shaft to raise and lower the flask, substantially as described.

5. In a molding machine, spaced apart vertical supports, a cross member connecting the upper ends thereof, a post slidably mounted for vertical movements in the cross member, a table attached to the upper end of the post, means for raising and lowering the post and table, vertical sleeves on the supports, rods slidable in the sleeves, members carried at the upper end of the rods, rods projecting from the members through the table, devices vertically adjustable carried in the upper ends of the rods, and means to raise and lower the first mentioned rods in the sleeves, substantially as described.

6. In combination in a molding machine, a support, a post provided with a rack at one side slidably mounted in the support for vertical movements, a table at the upper end of the post, a shaft, a pinion on the shaft engaging with the rack, means to turn the shaft, rods extending through the table, and means to raise and lower the rods with respect to the table, substantially as described.

7. In a molding machine, a carriage, spaced apart supports thereon, a shaft carried by and between the supports, a pair of spaced apart members fixed to the shaft, each having arms extending in opposite directions from the shaft, a bar connecting the ends of one pair of arms, springs interposed between said arms and the carriage, a flask rotatably mounted between the ends of the other pair of arms, means for fixing the flask in rigid relation to the arms, said means being detachable to free the flask for rotation, means for rotating the shaft to raise and lower the flask, a table located below the flask and means to raise and lower the table, substantially as described.

8. In a molding machine, a table, a shaft, supports therefor, arms secured to and projecting from the shaft, a flask rotatably mounted between the arms directly above the table, means to rotate the shaft to raise and lower the flask with respect to the table, and detachable means for securing the flask in fixed relation to the arms, substantially as described.

9. In a molding machine, spaced apart supports, a shaft rotatably mounted between and carried by the supports, a handle positioned adjacent the end of the shaft, gearing connections between the handle and shaft for rotating the shaft by turning the handle, a pin slidably mounted in the end of the shaft adapted to be interposed in the path of movement of said handle, spaced apart arms secured to the shaft, and a flask rotatably mounted between said arms.

10. In combination, a carriage including spaced apart frame members, vertical supports extending upwardly therefrom, a cross member connecting the upper ends of said vertical supports, a vertical post slidably mounted in the cross member, a rack formed on one side of the post, a shaft mounted between and carried by the frame members, a pinion on the shaft meshing with the rack, a handle on the end of the shaft, means to hold the handle with the post in upper position, a table carried at the upper end of the post, sleeves connected to the vertical supports, vertical rods slidably mounted in the sleeves, a second shaft lying between and carried by the frame members, cams on said shaft on which the lower ends of said rods rest, a handle secured to the second shaft for rotating it and elevating the rods, a member secured to the upper end of each rod, a pair of rods projecting upwardly from each member through the table, and headed screws threaded into the upper ends of said last rods, substantially as described.

In testimony whereof I affix my signature.

OSCAR P. NYSTROM.